United States Patent [19]

Kwon et al.

[11] Patent Number: 4,824,587

[45] Date of Patent: Apr. 25, 1989

[54] COMPOSITES OF COERCIVE PARTICLES AND SUPERPARAMAGNETIC PARTICLES

[75] Inventors: O'Dae Kwon; Jitka Solc, both of Midland, Mich.

[73] Assignee: The Dow Chemical Company, Midland, Mich.

[21] Appl. No.: 712,821

[22] Filed: Mar. 18, 1985

[51] Int. Cl.[4] .......................... H01F 1/26; H01F 1/28
[52] U.S. Cl. ............................. 252/62.55; 252/62.54
[58] Field of Search .......................... 252/62.53, 62.54

[56] References Cited

U.S. PATENT DOCUMENTS

| | | | |
|---|---|---|---|
| 2,594,893 | 4/1952 | Faus | 252/62.54 |
| 2,954,303 | 9/1960 | Westcott | 252/62.54 |
| 3,148,082 | 9/1964 | Ricco et al. | 252/62.54 |
| 3,371,044 | 2/1968 | Cochardt | 252/62.54 |
| 3,764,539 | 10/1973 | Cochardt et al. | 252/62.53 |
| 4,020,236 | 4/1977 | Aonuma et al. | 252/62.54 |
| 4,364,988 | 12/1982 | Andch et al. | 252/62.54 |
| 4,504,562 | 3/1985 | Miyakawa et al. | 252/62.54 |
| 4,719,027 | 1/1988 | Raistrick et al. | 252/62.54 |

FOREIGN PATENT DOCUMENTS

| | | | |
|---|---|---|---|
| 58-34872 | 3/1983 | Japan | 252/62.53 |
| 60-118764 | 6/1985 | Japan | 252/62.54 |

OTHER PUBLICATIONS

WohlFarth, Ferromagnetic Materials, vol. 2. North-Holland Publishing Company N.Y., 1980 pp. 438–439.

Kneller et al., Particle Size Dependence of Coercivity and Remanence of Single-Domain Particles, Journal of Applied Physics, No. 3, vol. 34, Mar. '63, p p. 656–658.

Lubersky, "Comparison of the Size of Spherical Particles of Iron, Cobalt . . . In Mercury" . . . , Journal of Applied Phys., vol. 33, No. 6, Jun. 1962, 1909–1913.

Luborsky, "The Kinetics of Growth of Spherical Iron Crystallites In Mercury", Journal of Physical Chemistry, vol. 61, (1957), pp. 1336 to 1340.

*Primary Examiner*—John Doll
*Assistant Examiner*—Robert M. Kunemund

[57] ABSTRACT

Composites of coercive particles and superparamagnetic particles comprise an intimate admixture of said particles in a dielectric matrix. The particles are admixed in such a fashion as to provide a composite which exhibits a coercivity which behaves as if the coercive particles and the superparamagnetic particles interact. Composites exhibiting such controlled coercivity are useful in the manufacture of transformers, magnets and magnetic tapes.

10 Claims, No Drawings

COMPOSITES OF COERCIVE PARTICLES AND SUPERPARAMAGNETIC PARTICLES

BACKGROUND OF THE INVENTION

This invention relates to composite materials, and particularly, to composite materials which exhibit magnetic properties.

The coercive force in referring to magnetic materials is the reverse magnetic field which must be applied to a magnetic material in order to make the magnetization of the material vanish. Correspondingly, the coercivity in referring to a material is that coercive force of a magnetic material in a hysteresis loop, wherein the maximum magnetization approximates the saturation magnetization. Providing materials having controlled coercivities are desirable for fabricated articles such as transformers, (where minimum coercivity is required), magnetic tapes (where a controlled intermediate coercivity is required), and magnets (where a maximum coercivity is required). For example, by altering the size, shape and composition of coercive materials, numerous coercive properties can be obtained.

Materials having coercive properties have a particle size above a certain size at which superparamagnetization occurs. Maximum coercive properties are observed by particles having a single domain stage. Composites prepared from coercive particles can exhibit less coercivity. Mixtures of coercive particles and superparamagnetic particles have been disclosed in E. Kneller, *Magnetism and Metallurgy*, Vol. I (A. E. Berkowitz and E. Kneller, ed.) Academic Press (1969). However, such mixtures are disclosed as being present at very low concentrations as relatively dilute mixtures. Thus, such a disclosure provides no direction towards the preparation of composites which are useful in numerous applications.

It would be highly desirable to provide a useful composite having magnetic properties which composite exhibits coercive properties which can be effected by superparamagnetic materials.

SUMMARY OF THE INVEINTION

The present invention is a composite exhibiting magnetic properties and a controlled coercivity, said composite comprising a solid dielectric material having dispersed therein an intimate mixture of (a) coercive particles, and (b) superparamagnetic particles.

In another aspect, this invention is a stable fluid dispersion of (1) coercive particles and (2) superparamagnetic particles contained in a dielectric material. Surprisingly, the dispersion can be applied as a coating and dried to form a continuous film composite or powder form composite wherein the coercive particles are maintained in an essentially discrete spaced apart relationship in the dielectric material and wherein the superparamagnetic particles can behave as if such particles are uniformly dispersed so as to encapsulate the coercive particles.

The compositions of this invention provide the skilled artisan with a means for providing a process by which coercivity adjustment of a composite can be controlled. Surprisingly, the composite can exhibit coercive properties which are such that these appear to be a short range interaction effect between the coercive particles and the superparamagnetic particles of the composite. The composites of this invention are not limited to dilute mixtures of superparamagnetic and coercive particles as are disclosed in Kneller, supra, where interaction effects do not appear to occur. In addition, the superparamagnetic particles which are employed in the form of a ferrofluid (i.e., an aqueous dispersion) can surround or encapsulate coercive particles in order to provide interactive effects between the respective particles.

The composites of this invention are particularly effective in applications where coercivity adjustment is desirable, as for example, where minimum to maximum coercivity requirements are useful. Such composites are useful in the manufacture of transformers; magnetic tapes, disks and toners; and magnets.

DETAIELED DESCRIPTION OF THE INVENTION

The composites of this invention comprise three essential components: (1) a dielectric material which can act as a dielectric solid matrix acting as the continuous phase for the composition, (2) a coercive particulate material which can be maintained within the solid matrix, and (3) a superparamagnetic particulate material. In the preferred composites, the superparamagnetic particulate materials are dispersed in the solid matrix in such a way that the composite behaves as if the superparamagnetic particles encapsulate the coercive particles.

Coercive particles useful in this invention are any magnetic particles which are of a size greater than that at which superparamagnetism is exhibited. Preferably, the coercive particles are of a size within a range such that said particles exhibit a coercivity great enough to exhibit interaction effects when combined with the superparamagnetic particles. The coercivity of such particles can depend upon factors such as the shape, size and composition of the particles. Most preferably, such particles are of a size very nearly equal to, or equal to, the single domain stage. Typically, the single domain stage is that stage at which the coercive particle is of such a size that the maximum magnetic effects are observed (i.e., coercivity is a maximum).

The grain size of the coercive particles can vary and depend upon the type of material which is employed. Generally, coercive particles exhibit a grain size which ranges from about 0.05 $\mu$m, to about 25 $\mu$m, preferably from about 0.05 to about 10 $\mu$m, more preferably from about 0.5 $\mu$m to about 5 $\mu$m in diameter. The coercive particles can form agglomerates, which agglomerates can vary and can range in size from about 1 $\mu$m to about 500 $\mu$m.

Superparamagnetic particles are those magnetic particles which are of a size such that the particles exhibit superparamagnetic properties. The grain size of the superparamagnetic particles can vary and depend upon the type of material which is employed. Generally, superparamagnetic particles exhibit a grain size which ranges from about 0.005 $\mu$m to about 0.05 $\mu$m, preferably from about 0.01 $\mu$m to about 0.03 $\mu$m.

The magnetic materials of which the coercive particles and the superparamagnetic particles are comprised can vary. Examples of suitable magnetic materials include the spinel ferrites and the magneto-plumbite ferrites, the garnets and ferromagnetic alloys. Examples of spinel ferrites can be represented by the formula $$XO \cdot Fe_2O_3$$

where X is iron, cobalt, nickel, magnesium, manganese or copper. Spinel ferrites can include the mixed ferrites such as those prepared from nickel/zinc, manganese/zinc or lithium/zinc. Examples of magneto-plumbite ferrites can be represented by the formula $$YO \cdot 6(Fe_2O_3)$$

wherein Y is barium, strontium, or lead. Examples of garnets include those materials represented by the formula $$3Z_2O_3 \cdot 5Fe_2O_3$$

where Z is a trivalent magnetic material such as a rare earth. Examples of ferromagnetic alloys include nickel/iron, nickel/cobalt, aluminum/nickel/cobalt, samarium/cobalt and cobalt/iron. Representative magnetic materials are disclosed in Chikazumi, *Physics of Magnetism*, Wiley & Sons (1964) and Smit and Wijn, *Ferrites*, Wiley & Sons (1959).

As used herein in referring to "an intimate mixture" of coercive particles and superparamagnetic particles is meant a mixture of said particles contacted in such a means as to provide an interaction effect to the coercivity behavior of the coercive particles, and in particular, a short range exchange interaction effect. By the term "controlled coercivity" is meant that the composite of this invention exhibits interacting coercivity properties which are not exhibited by a simple mixture (as for example a dilute mixture) of coercive particles and superparamagnetic particles over a range of mixtures of said particles.

The dielectric matrix is suitably any normally solid material capable of serving as an insulating matrix (binder) for the coercive and superparamagnetic particles. Preferably, it has an electrical resistivity greater than $10^6$ ohms per centimeter (ohms/cm), more preferably greater than about $10^{10}$ ohms/cm, most preferably from about $10^{15}$ to $10^{20}$ ohms/cm. Examples of such suitable dielectrics include glass, ceramics, waxes, plastics, including thermoplastics and thermosets, rubber polymers and the like, with the synthetic plastics being preferred. Of the synthetic plastics, preferred are polymers that are water-insoluble and are prepared from hydrophobic monomers that are essentially water-immiscible, i.e., the monomer forms a separate phase when 5 grams of the monomer is mixed with 100 grams of water. Such water-immiscible monomers will polymerize under emulsion polymerization conditions to form a water-insoluble polymer which will exist in the form of a stable aqueous colloidal dispersion, usually with the aid of suitable surface active agents.

The amounts of coercive particles relative to the superparamagnetic particles can vary over a very broad range. Preferred amounts of coercive particles relative to the amounts of superparamagnetic particles can range from about 99:1 to about 50:50, based on the weight of the particle components. Such a preferred range is that range in which maximum interaction effects occur. In addition, it is understood that large amounts of superparamagnet particles relative to coercive particles can be employed without providing any substantial increase in interaction effects.

In the preparation of the composites of this invention, it is advantageous to disperse the superparamagnetic particulate into the dielectric matrix such that dielectric matrix forms a continuous phase that maintains the properties of superparamagnetic particles in an essentially discrete, spaced apart relationship. Any of a variety of conventional blending procedures for incorporating a colloidal or sub-colloidal particulate into dielectric binders are suitably employed for this purpose. See, for example, U.S. Pat. No. 4,419,339.

In one aspect, the dielectric matrix having the superparamagnetic particles dispersed therein is prepared by initially forming an aqueous dispersion of the superparamagnetic particulate by contacting sub-colloidal particles of said superparamagnetic particulate with an aqueous solution of a water-soluble surfactant or emulsifier, thereby forming the dispersion which contains from about 5 to about 70 weight percent of the superparamagnetic particles. Preferably, such aqueous dispersions are aqueous dispersions of the magnetic metals or magnetic metal oxides which are stabilized by the presence of surfactants, emulsifiers and/or chemical dispersants as described hereinafter.

Typically, suitable surface active agents, dispersants or emulsifiers include salts of fatty acids such as potassium oleate, metal alkyl sulfates such as sodium lauryl sulfate, salts of alkyl aryl sulfonic acids such as sodium dodecylbenzene sulfonate, polysoaps such as sodium polyacrylate and alkali metal salts of methyl methacrylate/2-sulfoethyl methacrylate copolymers and other sulfoalkyl acrylate copolymers, and other anionic surfactants such as the dihexyl ester of sodium sulfosuccinic acid; nonionic surfactants such as the nonionic condensates of ethylene oxide with propylene oxide, ethylene glycol and/or propylene glycol; and cationic surfactants such as alkylamine-guanidine polyoxyethanols, as well as a wide variety of micelle generating substances described by D. C. Blackley in *Emulsion Polymerization*, Wiley and Sons, Chapter 7 (1975) and other surfactants listed in McCutcheon's *Detergents and Emulsifiers*, 1980 Annual North American Edition, McCutcheon, Inc., Morristown, N.J. Also included among the suitable surfactants are the surface active polymers (often called polysoaps), e.g., those described in U.S. Pat. No. 3,965,032. Of the suitable surfactants, the anionic varieties such as the potassium salts of functionalized oligomers, e.g., Polywet varieties sold by Uniroyal Chemical, are preferred. Such surface active agents or emulsifiers are employed in amounts sufficient to provide a stable dispersion of the superparamagnetic particles in water. Preferably, such surface active agents are employed in concentrations in the range from about 0.2 to about 10, most preferably from about 1 to about 6, weight percent based on the aqueous phase. Particularly desirable processes for forming such aqueous colloidal dispersions of the superparamagnetic particles are described in U.S. Pat. Nos. 3,826,667; 3,981,844; 3,843,540 and *Industrial Engineering Production and Research Development*, Vol. 19, 147–151 (1980).

The aqueous dispersion of the superparamagnetic particles is then combined with the water-immiscible monomer as described herein to form the desired emulsion by normal mixing procedures, for example, by passing both the dispersion and monomer through a high shear mixing device such as a Waring blender, homogenizer or ultrasonic mixer. Alternatively and preferably, the monomer is added continuously to the aqueous dispersion of the superparamagnetic particles during the polymerization. Advantageously, the monomer is in the form of an aqueous emulsion of the monomer which emulsion is maintained by a water-soluble monomer and/or a water-soluble emulsifier such as described hereinbefore. As another alternative, the aqueous emulsion of the superparamagnetic particles and water-immiscible monomer can be prepared by adding colloidal or sub-colloidal particles of the superparamagnetic particle to an existing aqueous emulsion of monomer. In such instances, it is often desirable to add additional emulsifier or surfactant to the emulsion prior to or simultaneous with the addition of the particles of the superparamagnetic particle. In the emulsion of the superparamagnetic particle and water-immiscible monomer in water, the aqueous phase is present in a proportion sufficient to be the continuous phase of the emulsion. The superparamagnetic particle is present in proportions sufficient to provide the superparamagnetic particulate with the desired magnetic properties. The water-immiscible monomer is present in proportion sufficient to enclose or encapsulate the superparamagnetic particle when polymerized. The emulsifier and/or surface active agent is present to provide an aqueous colloidal emulsion which is sufficintly stable to be subjected to emulsion polymerization conditions. Preferably, the emulsion contains from about 0.1 to about 25 weight percent of superparamagnetic particles, from about 1 to about 30 weight percent of monomer and a remaining amount of the aqueous phase including emulsifier (surfactant), catalyst and the like.

Examples of suitable water-immiscible monomers that can be employed to prepare the aforementioned dielectric matrix having the superparamagnetic particles dispersed therein include monovinylidene aromatic monomers such as styrene, vinyl toluene, t-butyl styrene, chlorostyrene, vinylbenzyl chloride and vinyl pyridine; alkyl esters of $\alpha, \beta$-ethylenically unsaturated acids such as ethyl acrylate, methyl methacrylate, butyl acrylate and 2-ethylhexyl acrylate; unsaturated esters of saturated carboxylic acids such as vinyl acetate, unsaturated halides such as vinyl chloride and vinylidene chloride; unsaturated nitriles such as acrylonitrile; dienes such as butadiene and isoprene; and the like. Of these monomers, the monovinylidene aromatics such as styrene and the alkyl acrylates such as butyl acrylate are preferred.

In addition to the aforementioned water-immiscible monomer, relatively minor portions (e.g., less than 10, preferably less than 5, weight percent based on total monomer component) of a water-soluble monomer such as an ethylenically unsaturated carboxylic acid or its salt such as acrylic acid or sodium acrylate; methacrylic acid, itaconic acid and maleic acid; an ethylenically unsaturated carboxamide such as acrylamide; vinyl pyrrolidone; hydroxyalkyl acrylates and methacrylates such as hydroxyethyl acrylate, hydroxypropyl acrylate and hydroxyethyl methacrylate; aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride may be employed. It is critical in the practice of this preferred embodiment, that such water-soluble monomers not be employed in amounts sufficient to render the resulting polymer soluble in water. Particularly effective monomer recipes for the practice of this invention are those containing from about 20 to about 90 weight percent of styrene, from about 10 to about 80 weight percent of alkyl acrylate such as butyl acrylate and from about 0.01 to about 2 weight percent of the unsaturated carboxylic acids such as acrylic acid, with said weight percentages being based on the weight of total monomers.

The emulsion polymerization conditions employed in the practice of this preferred embodiment of the invention are generally those of conventional free-radical type polymerizations carried out in the presence of a radical initiator such as a peroxygen compound, an azo catalyst, ultraviolet radiation, and the like. Preferably, such polymerization is carried out in the presence of a water-soluble peroxygen compound at temperatures in the range from about 50° to about 90° C. The emulsion is generally agitated during the polymerization period in order to maintain adequate feed transfer. The concentration of catalyst is normally in the range from about 0.005 to about 8, preferably from about 0.01 to about 5, weight percent based on total momomer. Examples of suitable catalysts include inorganic persulfate compounds such as sodium persulfate, potassium persulfate, ammonium persulfate; peroxides such as hydrogen peroxide, t-butyl hydroperoxide, dibenzol peroxide and dilauroyl peroxide; azo catalysts such as azobisisobutyronitrile, and other common free-radical generating compounds. Also suitable are various forms of free-radical generating radiation means such as ultraviolet radiation, electron beam radiation and gamma radiation. Alternatively, a redox catalyst composition can be employed wherein the polymerization temperature ranges from about 25° to about 80° C. Exemplary redox catalyst compositions include a peroxygen compound as described hereinbefore, preferably potassium persulfate or t-butyl hydroperoxide and a reducing component such as sodium metabisulfite and sodium formaldehyde hydrosulfite. It is also suitable to employ various chain transfer agents such as mercaptans, e.g., dodecyl mercaptan; dialkyl xanthogen disulfides; diaryl disulfides and others listed in Blackley, supra, Chapter 8 in concentrations as described therein.

Following emulsion polymerization, the resulting aqueous dispersion of the particles can be withdrawn from the polymerization vessel and (1) the dispersion is employed as is or (2) the unreacted monomer and other volatiles are removed to form a concentrated dispersion and then used as a paint base for the composite or (3) the composite particulate can be separated from the aqueous continuous phase of the dispersion by conventional means such as spray drying or drying under vacuum. If dried, the particulate preferably contains from about 10 to about 80, most preferably from about 15 to about 70, weight percent of the superparamagnetic particulate; and from about 90 to about 20, most preferably from about 85 to about 30, weight percent of dielectric matrix polymer.

In the preferred embodiment, the aqueous emulsion of superparamagnetic particulate containing latex is combined with the coercive particles to provide the composite. Preferably, the coercive particles are dispersed in an aqueous dispersion of the aforementioned latex, thereby forming a composition which can be applied to a substrate (e.g., to form a film) and/or dried (e.g., as in spray drying). For example, the composite can be applied to a substrate as a coating.

In dry form, the resulting compositions can be fabricated into an article of desired shape by conventional fabrication techniques such as injection or compression molding, extrusion and the like. Alternatively, the composition in the form of a dry powder is dispersed in a nonaqueous liquid medium and employed as desired, e.g., as a paint base or base for other coating formulations. In addition, the dry form composition can be blended, admixed, etc. with other polymeric or resinous materials. Such other materials include thermosetting materials such as polyurethanes and epoxy resins; thermoplastic materials; thermoplastic elastomers; rubber containing materials; and the like.

The following examples are given to illustrate the invention and should not be construed as limiting its scope. Unless otherwise indicated, all parts and percentages are by weight.

EXAMPLE 1

A. Preparation of Aqueous Dispersion of $Fe_3O_4$

An aqueous dispersion of magnetic iron oxide ($Fe_3O_4$) is prepared by mixing aqueous solutions of ferric and ferrous salts in amounts to maintain the $FE^{+3}/FE^{+2}$ molar ratio at ~2:1. Magnetic iron oxide is then precipitated at 0°–10° C. by rapid addition of 1N aqueous ammonia and vigorous agitation until a pH of 9–10 is reached. Immediately thereafter, the dispersant is introduced with agitation to the aqueous medium containing the precipitated iron oxide and the mixture is heated at 90° C. for two hours. (During this period, hydrochloric acid is added until the pH of the mixture reaches 7.5.) The particles of precipitated iron oxide are washed with deionized water and redispersed in deionized water containing ~0.5 g of a potassium salt of a functionalized oligomer (Polywet KX-4 sold by Uniroyal Chemical) per gram of precipitated iron oxide, by using an ultrasonic probe.

B. Preparation of Magnetic Latex Sample No. 1

To a 3-neck flask equipped with a stirrer, two addition funnels and a condenser is added a mixture of 1015 g of the 28.6 percent solids dispersion of $Fe_3O_4$ (average particle size about 0.025 micrometer) and 619 g of deionized water. The mixture is then heated under nitrogen atmosphere to 90° C. while stirring. At this temperature of 90° C., a monomer stream and an aqueous surfactant stream are separately introduced via the two addition funnels into the flask, each stream being introduced at the rate of ~4 ml/min over a period of 60 minutes. Th monomer stream consists of 30 g of styrene, 87 g of 2-ethylhexyl acrylate and 9.7 g of t-butyl hydroperoxide. The aqueous stream consists of 150 g of deionized water, 8.65 g of the potassium salt of a functionalized oligomer ("Polywet KX-4") and 2 g of sodium formaldehyde hydrosulfite. The resulting reaction mixture is stirred and maintained under nitrogen at 90° C. for an additional half hour. The resulting 20 percent solids latex is concentrated by distillation under vacuum to a 28.4 percent solids latex having dispersed particles with a polymeric as well as magnetic characteristic. The latex comprises particles of $Fe_3O_4$ having a grain size ranging from 0.01 μm to 0.03 μm. An aqueous dispersion of the superparamagnetic particle containing latex comprises 38.6 percent solids, which solids comprise 49 percent $Fe_3O_4$ and 51 percent polymer. The coercivity (Hc) of the liquid latex emulsion is determined to be 0 oersted (Oe) using a Princeton Applied Research Model No. 155 vibrating sample magnetometer. The saturation magnetization (Ms) of the sample is determined to be 25 electromagnetic units per gram of sample (emu/g).

Coercive particles are provided. Barium ferrite particles have a grain size ranging from 1 μm to 2 μm, an aggregate size of −325 mesh, Hc of 2500 Oersted (Oe) and are sold commercially as Barium Ferrite, No. 307 Embedding Powder by Ferro Corporation. Strontium ferrite particles have a grain size ranging from 5 μm to 6 μm, an aggregate size of −325 mesh, Hc of 1400 Oe and are sold commercially as Strontium Ferrite No. 206 Ceramic Powder by Ferro Corporation.

Samples 1–5 are provided by wet blending the aforementioned latex dispersion with the barium ferrite coercive particles and stirring at about 80 to about 100 rpm for about 10 minutes. The blend is cast on a Mylar film (commercially available from duPont) and dried at room temperature for several hours in order to provide a film having a thickness of not more than about 5 mil. Samples 0.25 inch in diameter are cut from the film and magnetic properties are determined using the aforementioned vibrating sample magnetometer. Data are presented in Table I.

Sample Nos. 6–10 are provided by wet blending the aforementioned latex dispersion with the strontium ferrite coercive particles as previously descibed and processing as previously described. The magnetic properties of the composite are determined as previously described for Sample Nos. 1–5. Data are presented in Table I.

For comparison purposes are provided composites of coercive particles and agglomerated superparamagnetic particles in noninteracting concentrated mixture form. Sample Nos. C-1 through C-5 are provided by dry blending and thoroughly mixing the barium ferrite and superparamagnetic powder particles. The superparamagnetic powder particles are provided by freeze drying freshly prepared aqueous dispersions of superparamagnetic $Fe_3O_4$ particles coated with the Polywet KX-4 surfactant. The dried powder is milled for 24 hours in a ceramic ball mill and screened through a −325 mesh screen. The superparamagnetic particles have a grain size of 0.01 μm to 0.03 μm and an aggregate size of −325 mesh, an Hc=0 and Ms=59.1 emu/g.

Comparative Sample Nos. C-6 through C-10 are provided by similarly blending strontium ferrite composite particles and the aforementioned superparamagnetic powder particles. Data are presented in Table I.

TABLE I

| Sample No. | Coercive Particle Type | Amount (g) | Superparamagnetic[1] (SPM) Material Type | Amount (g) | Fraction[2] SPM | Hc[3] Oe | hr[4] |
|---|---|---|---|---|---|---|---|
| C-1* | $BaO.6(Fe_2O_3)$ | 22.5 | Powder | 2.5 | 0.061 | 1780 | 0.712 |
| C-2* | $BaO.6(Fe_2O_3)$ | 18.75 | Powder | 6.25 | 0.164 | 1360 | 0.544 |
| C-3* | $BaO.6(Fe_2O_3)$ | 12.5 | Powder | 12.5 | 0.37 | 500 | 0.2 |
| C-4* | $BaO.6(Fe_2O_3)$ | 6.25 | Powder | 18.75 | 0.638 | 100 | 0.04 |
| C-5* | $BaO.6(Fe_2O_3)$ | 25 | Powder | 0 | 0 | 2500 | 1 |
| 1 | $BaO.6(Fe_2O_3)$ | 0.5 | Latex | 4 | 0.6 | 80 | 0.032 |
| 2 | $BaO.6(Fe_2O_3)$ | 1 | Latex | 4 | 0.43 | 340 | 0.135 |
| 3 | $BaO.6(Fe_2O_3)$ | 2 | Latex | 4 | 0.275 | 1100 | 0.44 |
| 4 | $BaO.6(Fe_2O_3)$ | 3 | Latex | 1.5 | 0.087 | 2100 | 0.84 |
| 5 | $BaO.6(Fe_2O_3)$ | 4 | Latex | 4 | 0.16 | 1800 | 0.72 |
| C-6* | $SnO.6(Fe_2O_3)$ | 22.5 | Powder | 2.5 | 0.061 | 890 | 0.636 |

TABLE I-continued

| Sample No. | Coercive Particle Type | Amount (g) | Superparamagnetic (1) (SPM) Material Type | Amount (g) | Fraction(2) SPM | $H_c$(3) Oe | $h_r$(4) |
|---|---|---|---|---|---|---|---|
| C-7* | $SnO.6(Fe_2O_3)$ | 18.75 | Powder | 6.25 | 0.164 | 620 | 0.442 |
| C-8* | $SnO.6(Fe_2O_3)$ | 12.5 | Powder | 12.5 | 0.37 | 360 | 0.257 |
| C-9* | $SnO.6(Fe_2O_3)$ | 6.25 | Powder | 18.75 | 0.638 | 60 | 0.043 |
| C-10* | $SnO.6(Fe_2O_3)$ | 25 | Powder | 0 | 0 | 1400 | 1 |
| 6 | $SnO.6(Fe_2O_3)$ | 0.5 | Latex | 4 | 0.6 | 67 | 0.048 |
| 7 | $SnO.6(Fe_2O_3)$ | 1 | Latex | 4 | 0.43 | 260 | 0.185 |
| 8 | $SnO.6(Fe_2O_3)$ | 2 | Latex | 4 | 0.275 | 650 | 0.46 |
| 9 | $SnO.6(Fe_2O_3)$ | 4 | Latex | 4 | 0.16 | 1000 | 0.71 |
| 10 | $SnO.6(Fe_2O_3)$ | 6 | Latex | 3 | 0.087 | 1250 | 0.89 |

*Not an example of the invention.
(1)SPM material is $Fe_3O_4$.
(2)Weight fraction of superparamagnetic particulate component in composite.
(3)Hc is coercivity in Oersted
(4)hr is reduced coercivity.

The data in Table I illustrate the surprisingly high reduced coercivity (hr) of the samples of the invention having low amounts of superparamagnetic material (i.e., Sample Nos. 4,5, 9 and 10).

What is claimed is:

1. A stable, fluid aqueous dispersion comprising a mixture of (1) coercive particles and (2) a magnetic latex of from about 5 to about 70 weight percent of superparamagnetic particles in a hydrophobic polymer matrix wherein the hydrophobic polymer matrix maintains the superparamagnetic particles in an essentially discrete, spaced apart relationship.

2. A magnetic composite prepared by drying the aqueous dispersion of claim 1.

3. The composite of claim 2 in the form of a film or powder.

4. The composite of claim 2 wherein the coercive particles are of a size within a range such that said particles exhibit a coercivity great enough to exhibit interaction effects when combined with said superparamagnetic particles.

5. The composite of claim 2 wherein the coercive particles are of a size very nearly equal to the single domain stage.

6. The composite of claim 2 wherein the coercive particles exhibit a grain size which ranges from about 0.05 μm to about 25 μm.

7. The composite of claim 2 wherein the amount of coercive particles relative to the amount of superparamagnetic particles range from about 99:1 to about 50:50, based on the weights of said particle components.

8. The composite of claim 2 wherein the coercive particles are maintained in an essentially discrete spaced apart relationship in the dielectric material and wherein the superparamagnetic particles can behave as if such particles are uniformly dispersed so as to encapsulate the coercive particles.

9. The composite of claim 2 wherein said coercive particles are spinel ferrites, magnetoplumbite ferrites, garnets or ferromagnetic alloys.

10. The composite of claim 2 wherein said superparamagnetic particles are spinel ferrites, magnetoplumbite ferrites, garnets or ferromagnetic alloys.

* * * * *